(12) United States Patent
Lee et al.

(10) Patent No.: US 12,153,199 B2
(45) Date of Patent: Nov. 26, 2024

(54) CAMERA MODULE

(71) Applicant: Samsung Electro-Mechanics Co., Ltd., Suwon-si (KR)

(72) Inventors: Ji Hae Lee, Suwon-si (KR); Jung Kyun Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 447 days.

(21) Appl. No.: 17/225,267

(22) Filed: Apr. 8, 2021

(65) Prior Publication Data

US 2021/0405333 A1 Dec. 30, 2021

(30) Foreign Application Priority Data

Jun. 26, 2020 (KR) .................. 10-2020-0078709
Oct. 6, 2020 (KR) .................. 10-2020-0128525

(51) Int. Cl.
| | | |
|---|---|---|
| *G02B 13/00* | (2006.01) | |
| *G02B 7/18* | (2021.01) | |
| *G02B 27/64* | (2006.01) | |
| *G03B 5/00* | (2021.01) | |
| *G03B 30/00* | (2021.01) | |

(52) U.S. Cl.
CPC ........... *G02B 13/0065* (2013.01); *G02B 7/18* (2013.01); *G02B 27/646* (2013.01); *G03B 5/00* (2013.01); *G03B 30/00* (2021.01); *G03B 2205/0007* (2013.01)

(58) Field of Classification Search
CPC .... G02B 13/0065; G02B 7/18; G02B 27/646; G03B 30/00; G03B 5/00; G03B 2205/0007
USPC ................................ 359/819, 833, 837, 834
See application file for complete search history.

(56) References Cited

U.S. PATENT DOCUMENTS

| | | | |
|---|---|---|---|
| 4,432,626 A * | 2/1984 | Ohtake | G03B 19/12 396/377 |
| 5,317,444 A * | 5/1994 | Iwasaki | G02B 26/10 359/215.1 |
| 5,761,582 A | 6/1998 | Saito et al. | |
| 2007/0064318 A1* | 3/2007 | Yagyu | G02B 7/1805 359/811 |

(Continued)

FOREIGN PATENT DOCUMENTS

| | | |
|---|---|---|
| CN | 103257427 A | 8/2013 |
| CN | 106576138 A | 4/2017 |

(Continued)

OTHER PUBLICATIONS

CN-107404604-A English translation—2017—CN—Xu.*

(Continued)

*Primary Examiner* — Sharrief I Broome
(74) *Attorney, Agent, or Firm* — NSIP Law (57) ABSTRACT

A camera module is provided. The camera module include a housing; a folded module disposed in the housing and including a first reflective member; a lens module disposed in the housing and configured to receive light reflected from the folded module; a holder disposed in the housing and including a second reflective member configured to receive light passing through the lens module; and an image sensor configured to receive light reflected from the second reflective member, wherein a guide shaft disposed in the housing is configured to be inserted into the holder.

16 Claims, 6 Drawing Sheets

(56) References Cited

U.S. PATENT DOCUMENTS

| | | | |
|---|---|---|---|
| 2007/0109664 A1* | 5/2007 | Yagyu | G02B 15/144113 |
| | | | 359/686 |
| 2007/0183065 A1* | 8/2007 | Chigasaki | G02B 7/102 |
| | | | 359/819 |
| 2008/0024886 A1* | 1/2008 | Miyazawa | G02B 7/023 |
| | | | 359/819 |
| 2008/0030873 A1* | 2/2008 | Matsui | G02B 13/009 |
| | | | 359/696 |
| 2008/0291543 A1 | 11/2008 | Nomura et al. | |
| 2009/0034962 A1* | 2/2009 | Mitani | H04N 23/51 |
| | | | 348/373 |
| 2012/0051205 A1* | 3/2012 | Hiruma | G11B 7/133 |
| 2013/0278785 A1 | 10/2013 | Nomura et al. | |
| 2016/0044250 A1 | 2/2016 | Shabtay et al. | |
| 2017/0108670 A1 | 4/2017 | Ko | |
| 2017/0131526 A1 | 5/2017 | Park et al. | |
| 2018/0024329 A1 | 1/2018 | Goldenberg et al. | |
| 2018/0109660 A1 | 4/2018 | Yoon et al. | |
| 2018/0314138 A1 | 11/2018 | Inui et al. | |
| 2018/0364494 A1 | 12/2018 | Masahiro | |
| 2019/0227199 A1 | 7/2019 | Kao et al. | |
| 2019/0387139 A1* | 12/2019 | Zhang | H04N 23/55 |
| 2020/0057313 A1 | 2/2020 | Lee et al. | |
| 2020/0137274 A1 | 4/2020 | Lee et al. | |

FOREIGN PATENT DOCUMENTS

| | | | |
|---|---|---|---|
| CN | 106597652 A | | 4/2017 |
| CN | 106686285 A | | 5/2017 |
| CN | 107404604 A | * 11/2017 | ........... H04N 5/2253 |
| CN | 107533211 A | | 1/2018 |
| CN | 108139558 A | | 6/2018 |
| CN | 108432226 A | | 8/2018 |
| CN | 108449540 A | | 8/2018 |
| CN | 109963058 A | | 7/2019 |
| CN | 110082878 A | | 8/2019 |
| CN | 110764232 A | | 2/2020 |
| CN | 110879454 A | | 3/2020 |
| CN | 111103742 A | | 5/2020 |
| CN | 111246070 A | | 6/2020 |
| JP | 2009-217046 A | | 9/2009 |
| KR | 10-1292693 B1 | | 8/2013 |
| KR | 10-2013-0118817 A | | 10/2013 |
| KR | 10-2016-0140886 A | | 12/2016 |
| KR | 10-2018-0015966 A | | 2/2018 |
| KR | 10-2018-0041040 A | | 4/2018 |
| WO | WO 2015/153901 A | | 10/2015 |

OTHER PUBLICATIONS

Chinese Office Action issued on Nov. 25, 2022, in counterpart Chinese Patent Application No. 202110662267.7 (7 pages in English, 9 pages in Chinese).

Notice of Reason for Rejection issued on Oct. 25, 2021, in counterpart Korean Patent Application No. 10-2020-0128525 (9 pages in English and 6 pages in Korean).

Chinese Office Action issued on Aug. 7, 2023, in counterpart Chinese Patent Application No. 202110662267.7 (4 pages in English, 8 pages in Chinese).

* cited by examiner

CAMERA MODULE

CROSS-REFERENCE TO RELATED APPLICATION(S)

This application claims the benefit under 35 USC § 119(a) of priority to Korean Patent Application No. 10-2020-0078709 filed on Jun. 26, 2020, and Korean Patent Application No. 10-2020-0128525 filed on Oct. 6, 2020, in the Korean Intellectual Property Office, the entire disclosures of which are incorporated herein by reference for all purposes.

BACKGROUND

1. Field

The following description relates to a camera module.

2. Description of Related Art

Recently, camera modules have been implemented in portable electronic devices including, but not limited to, smartphones. A thickness of the form factor of a portable electronic device has been decreased to meet market demand, and accordingly, it is necessary for the camera modules to have a reduced size.

Additionally, to reduce the effect of a height of a camera module on a thickness of a portable electronic device, a camera module including a reflective member for changing a path of light has been implemented.

Since such a camera module may change a path of light through a reflective member, a total track length (TTL) (a distance from a lens the most adjacent to an object side to an imaging plane of an image sensor) of the camera module may not affect the thickness of a portable electronic device.

Additionally, a camera module including a plurality of reflective members has also been proposed to address the issue in which a total track length of a camera module is excessively increased in one direction.

However, since the reflective member is configured to change a path of light, assembly precision of the reflective member may affect quality of an image.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing; a folded module, disposed in the housing, and comprising a first reflective member; a lens module, disposed in the housing, and configured to receive light reflected from the folded module; a holder, disposed in the housing, and comprising a second reflective member configured to receive light passing through the lens module; and an image sensor, configured to receive light reflected from the second reflective member, wherein a guide shaft, disposed in the housing, is configured to be inserted into the holder.

The holder may be configured to be rotatably inserted into the guide shaft, and is fixed to the housing by an adhesive member.

The second reflective member may be configured to reflect light incident from the lens module in a first direction towards the image sensor in a second direction, and the guide shaft may be configured to extend in a direction perpendicular to the first direction and the second direction.

The guide shaft may have a cylindrical shape.

The holder may have a coupling portion having one of a hole shape and a groove shape into which the guide shaft is inserted.

The holder may include a contact surface extending in a third direction, parallel to the guide shaft, and the second reflective member may be seated on the contact surface.

When a length of the contact surface in a direction perpendicular to the third direction is L, a distance D between the guide shaft and the contact surface may be within a range satisfying the following equation: $0<D<L/4$ The guide shaft may be injection-formed together with the housing.

Light incident to the first reflective member in a first optical axis direction may be changed to travel in a second optical axis direction perpendicular to the first optical axis by the second reflecting member, and is incident to the lens module.

Light passing through the lens module is changed to travel in a third optical axis direction perpendicular to the second optical axis direction by the second reflective member, to reach the image sensor.

The third optical axis direction may be perpendicular to the first optical axis direction.

The first reflective member or the second reflective member may include one of a mirror and a prism.

In a general aspect, a camera module includes a folded module, disposed in a housing, and comprising a first reflective member configured to reflect light incident in a first optical axis direction; a lens module, disposed in the housing, and configured to receive light reflected from the folded module; a holder, disposed in the housing, and comprising a second reflective member configured to reflect light passing through the lens module and incident to the holder in a second optical axis direction; and an image sensor, configured to receive light passing through the second reflective member, wherein a guide shaft, provided in the housing, is configured to be inserted into the holder, and wherein the guide shaft extends in a direction parallel to the first optical axis and perpendicular to the second optical axis.

In a general aspect, an electronic device includes a camera module, including a housing; a first reflective module, configured to receive light incident in a first optical axis direction, and output light in a second optical axis direction perpendicular to the first optical axis direction; a lens module, disposed in the housing, and configured to receive light from the first reflective module; a second reflective module, configured to receive light from the lens module, and output light in a third optical direction perpendicular to the first optical axis direction and the second optical axis direction; an image sensor, configured to receive light from the second reflective module; and a guide shaft, configured to fix the second reflective module to the housing, wherein the second reflective module includes a holder, and the guide shaft is configured to be inserted into the holder.

The holder may include a contact surface extending in a third direction, parallel to the guide shaft, and a reflective member of the reflective module may be seated on the contact surface.

A length of the contact surface in a direction perpendicular to the third direction is L, a distance D between the guide shaft and the contact surface is within a range satisfying the following equation: Equation: 0<D<L/4.

The first reflective module may be configured to rotate with respect to the first optical axis direction and the second optical axis direction.

Other features and aspects will be apparent from the following detailed description, the drawings, and the claims.

DETAILED DESCRIPTION

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 1:
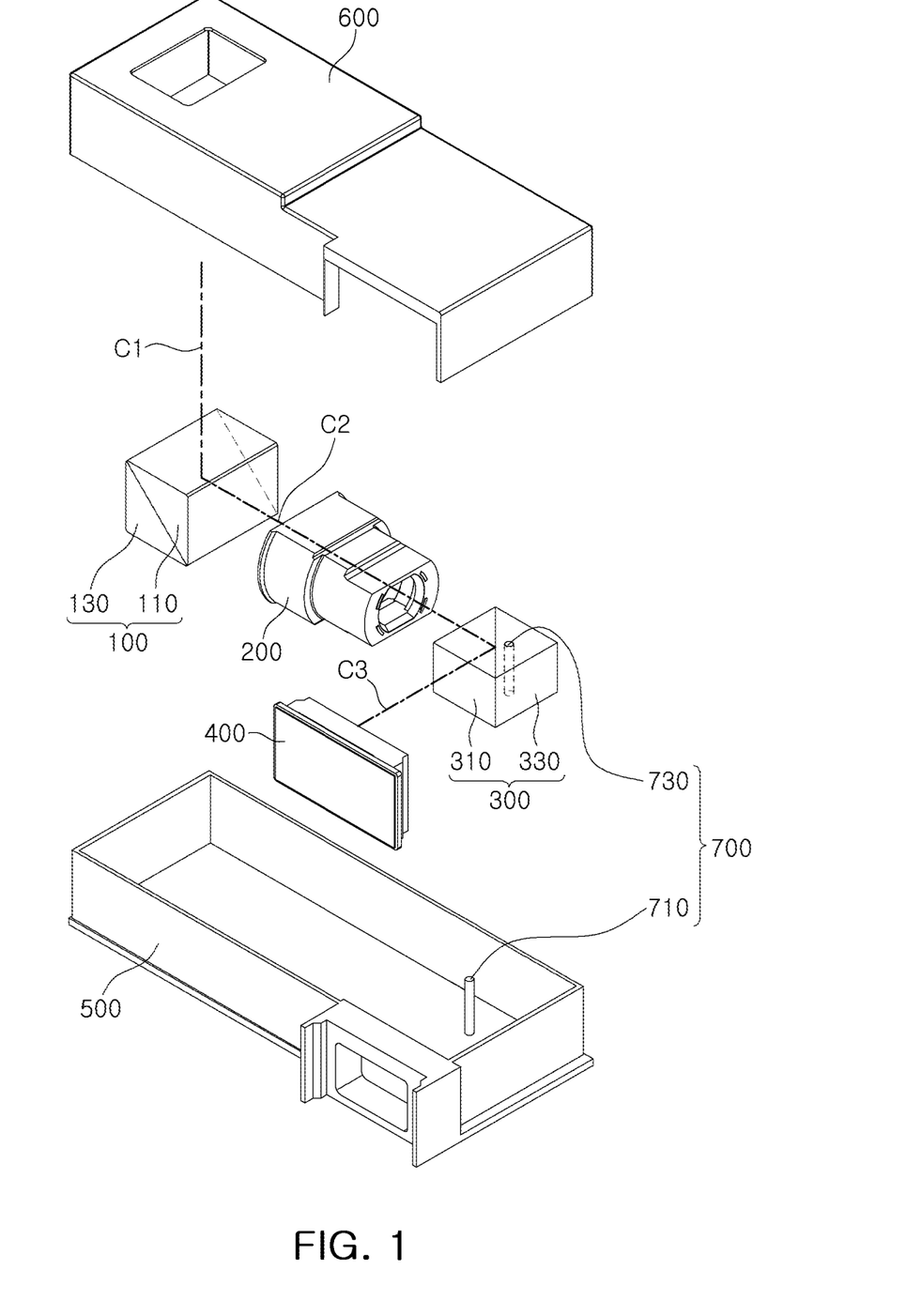
FIG. 1 is a perspective diagram illustrating an example camera module, in accordance with one or more embodiments.
Figure 2:
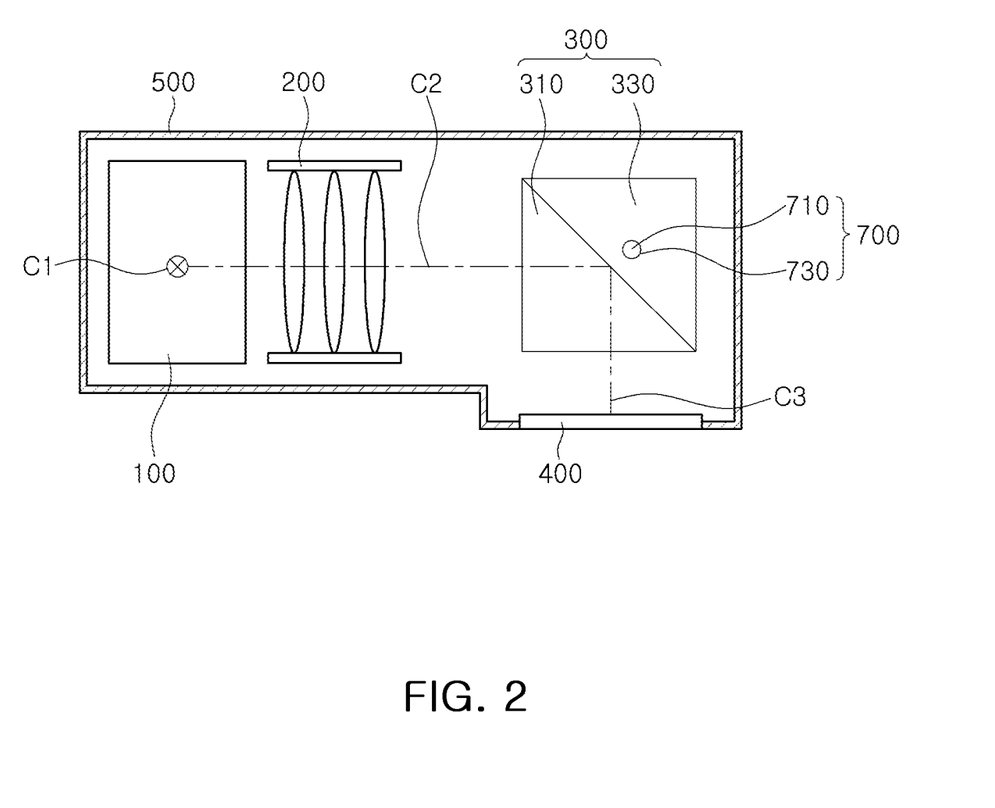
FIG. 2 is a plan diagram illustrating an example camera module, in accordance with one or more embodiments.

FIG. 1 is a perspective diagram illustrating an example camera module, in accordance with one or more embodiments. FIG. 2 is a plan diagram illustrating an example camera module, in accordance with one or more embodiments.

Referring to FIGS. 1 and 2, the example camera module may include a first reflective module 100, a lens module 200, a second reflective module 300, an image sensor 400, a housing 500, and a case 600. In the example embodiment, the reflective module 100 or 300 may be referred to as a folded module.

The housing 500 may have an internal space to accommodate the components of the camera module. In an example, the housing 500 may have a box shape with an open upper portion.

The housing 500 may accommodate one or more of the first reflective module 100, the lens module 200, the second reflective module 300 and the image sensor 400 therein. In an example, the first reflective module 100, the lens module 200, the second reflective module 300, and the image sensor 400 may be disposed in the internal space of the housing 500.

FIG. 2 illustrates an example in which all the first reflective module 100, the lens module 200, the second reflective module 300 and the image sensor 400 are accommodated in the housing 500. However, this illustrated arrangement is only an example. Differently from the example illustrated in FIG. 2, in an example, the first reflective module 100 may be provided separately from the housing 500, and in this example, one side of the housing 500 may be open such that light transferred from the first reflective module 100 may pass therethrough.

Referring to FIG. 2, a shape of a plane of the housing 500 may have a bent shape, bent in a "¬" shape. In an example, the first reflective module 100, the lens module 200, and the second reflective module 300 may be disposed in the internal space of the housing 500 from one side, for example, an object side, to the other side, for example, an image side, and the image sensor 400 may be disposed in a direction perpendicular to the direction from one side, for example, the object side, to the other side, for example, the image side, of the internal space of the housing 500.

The case 600 (FIG. 1) may be coupled to the housing 500 to cover the upper portion of the housing 500.

The lens module 200 may be disposed in the housing 500. The lens module 200 may include one or more lenses for imaging light incident to the camera module on the image sensor 400. The lens module 200 may be disposed between the first reflective module 100 and the second reflective module 300.

The first reflective module 100 may be disposed in front of the lens module 200, and may include a first reflective member 110 and a first holder 130.

The first reflective member 110 may be configured to change a direction of travel of light. In an example, the first reflective member 110 may be implemented by a prism or a mirror that reflects light.

The first reflective module 100 may be configured to change an optical path as illustrated in FIGS. 1 and 2.

In an example, an optical path of light incident in a first optical axis C1 direction may be changed to be directed to a second optical axis C2 by the first reflective module 100. The first optical axis C1 and the second optical axis C2 may intersect each other. In an example, the first optical axis C1 and the second optical axis C2 may be perpendicular to each other.

Light, of which the optical path is changed by the first reflective module 100, may be refracted while passing through the lens module 200.

The camera module in the example may compensate for hand shake during imaging. In an example, when shaking occurs during imaging, a relative displacement corresponding to the shaking may be applied to the first reflective module 100, thereby correcting the shaking.

In other words, the first reflective module 100 may rotate with reference to two axes to correct the shaking that may occur during imaging.

The second reflective module 300 may be disposed on a rear side of the lens module 200. Additionally, the second reflective module 300 may be disposed between the lens module 200 and the image sensor 400.

Figure 6:
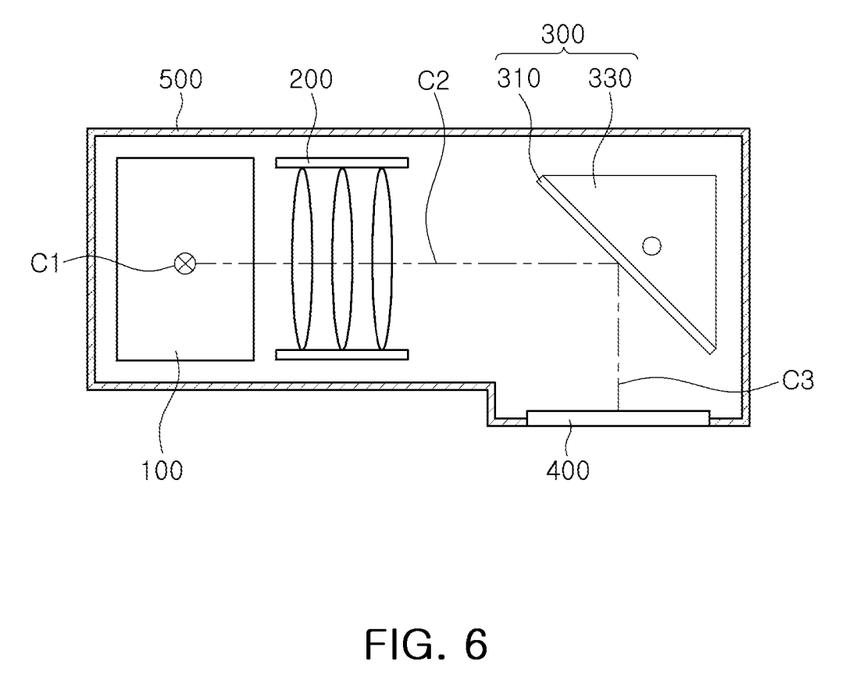
FIG. 6 is a plan diagram illustrating an example camera module, in accordance with one or more embodiments.

The second reflective module 300 may include a second reflective member 310 and a second holder 330. The second reflective member 310 may be configured to change a direction of travel of light. In an example, the second reflective member 310 may be implemented by a prism (see FIG. 2) or a mirror (see FIG. 6) which may reflect light.

The second reflective module 300 may be configured to change the optical path of light as illustrated in FIGS. 1 and 2.

In an example, the optical path of light which has been changed in the second optical axis C2 direction by the first reflective module 100 may be changed again to be directed to a third optical axis C3 by the second reflective module 300. The second optical axis C2 and the third optical axis C3 may intersect each other. In an example, the second optical axis C2 and the third optical axis C3 may be perpendicular to each other.

The third optical axis C3 may intersect with the first optical axis C1 and the second optical axis C2. In an example, the first optical axis C1, the second optical axis C2, and the third optical axis C3 may be perpendicular to each other. In other words, the first optical axis C1 and the second optical axis C2 may be perpendicular to each other, and the third optical axis C3 may be perpendicular to both the first optical axis C1 and the second optical axis C2.

The first reflective module 100 and the second reflective module 300 may be configured to change an optical path in different directions.

A travelling direction of light incident in the first optical axis C1 direction may be changed in the second optical axis C2 direction intersecting the first optical axis C1 direction by the first reflective module 100.

Additionally, a travelling direction of light in the second optical axis C2 direction may be changed in the third optical axis C3 direction intersecting the second optical axis C2 direction by the second reflective module 300.

Accordingly, the optical path may be changed twice until light incident to the camera module is formed on the image sensor 400. Accordingly, a height and a length of the camera module may be significantly reduced. Accordingly, a small-sized camera module may be provided.

It has been described that the optical path may be changed twice. However, is the examples are not limited thereto. The optical path may be changed at least twice. In the example, the second reflective module 300 may refer to a reflective module disposed most adjacent to the image sensor 400 among the plurality of reflective modules.

Since the first reflective module 100 and the second reflective module 300 are configured to change the optical path, the first reflective module 100 and the second reflective module 300 should be assembled to the camera module with precision.

Since the first reflective module 100 may rotate with respect to two axes, assembly precision of the second reflective module 300 may be more important than assembly precision of the first reflective module 100.

That is, since the second reflective module 300 is configured to be fixed, and may change an optical path in a position adjacent to the image sensor 400, assembly precision of the second reflective module 300 may greatly affect image quality.

The second reflective module 300 may include a second reflective member 310 and a second holder 330. The second reflective member 310 may be coupled to the second holder 330, and the second holder 330 may be coupled to the housing 500.

Accordingly, assembly precision of the second reflective module 300 may be determined according to how precisely the second holder 330 is assembled to the housing 500.

Referring to FIG. 1, the housing 500 may include a guide shaft 710 (or a protrusion) extending in one direction. The second reflective module 300 may include a coupling portion 730 that receives at least a portion of the guide shaft 710, and as the guide shaft 710 is inserted into the coupling portion 730, the second reflective module 300 may be assembled to the housing 500.

In an example, the coupling portion 730 may have a hole shape corresponding to the guide shaft 710. In an example, the coupling portion 730 may be implemented by a through-hole opened in both directions of the holder or a hole opened in a single direction.

In an example, the guide shaft 710 may extend in a direction perpendicular to the second optical axis and the third optical axis. In an example, the guide shaft 710 may extend in a direction parallel to a reflective surface of the second reflective member 300. In an example, the guide shaft may extend in a direction parallel to the first optical axis.

In an example, the second holder 330 may be assembled to the housing 500 in a direction parallel to the direction in which the guide shaft 710 extends, such that the guide shaft 710 is inserted into the coupling portion 730 of the holder.

Figure 3:
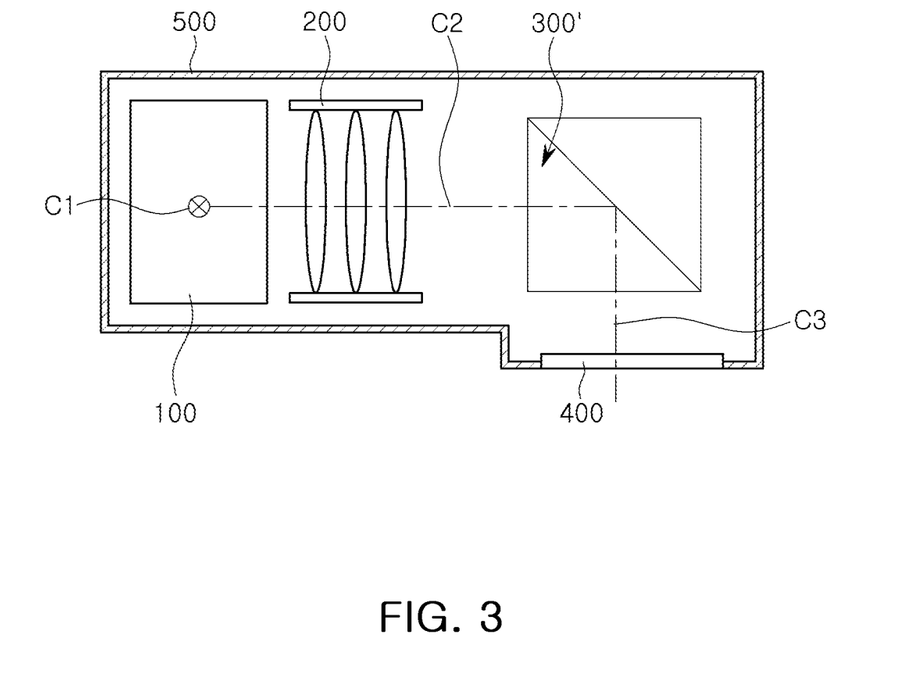
FIGS. 3 and 4 are diagrams illustrating an example in which image quality degrades by assembly tolerance of a reflective module.
Figure 4:
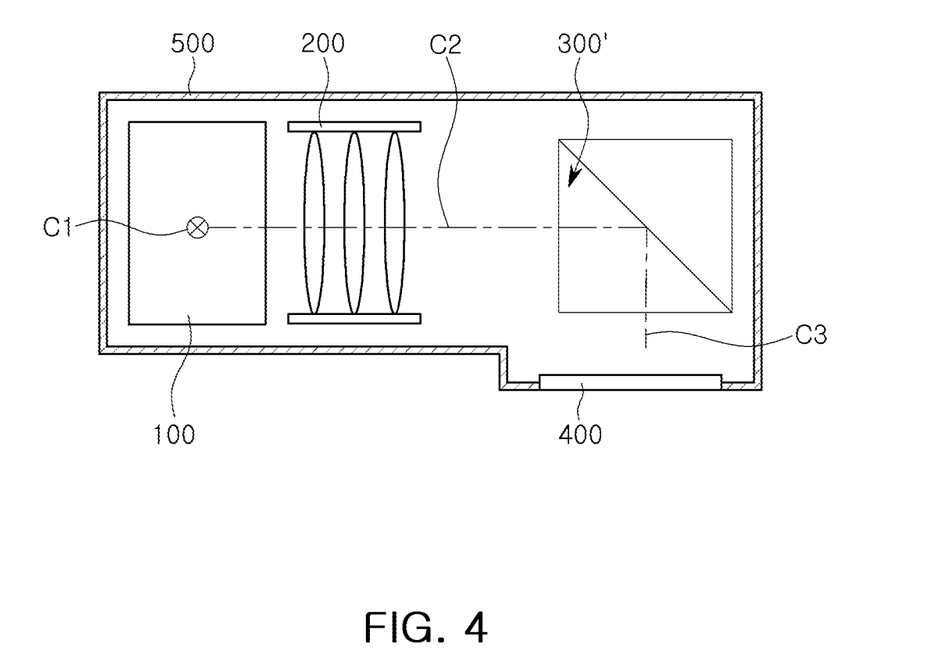

FIGS. 3 and 4 are diagrams illustrating an example in which image quality is degraded by assembly tolerance of a reflective module.

As illustrated in FIGS. 3 and 4, when the second reflective module 300' is assembled to be spaced apart from a determined position in the second optical axis C2 direction by a predetermined distance, a position at which the focus is formed may greatly change. Accordingly, image quality may be greatly deteriorated.

In an example, since a focal length of the lens module 200 disposed in front of the second reflective module 300' may not be affected by the position of the second reflective module 300', a focus may be formed in a predetermined position irrespective of the position of the second reflective module 300'.

Therefore, when the position of the second reflective module 300' deviates from a determined position, a focus may not be formed in an original position, and accordingly, image quality may greatly degrade.

Additionally, although not illustrated in the drawings, even when the second reflective module 300' is assembled to be spaced apart from the designed position in the third optical axis C3 direction by a predetermined distance, image quality may also be significantly deteriorated.

Therefore, the example camera module may include a guide unit 700 to reduce the shifting of the second reflective module 300 in the second optical axis C2 direction and the third optical axis C3 direction from the designed position.

Figure 5:
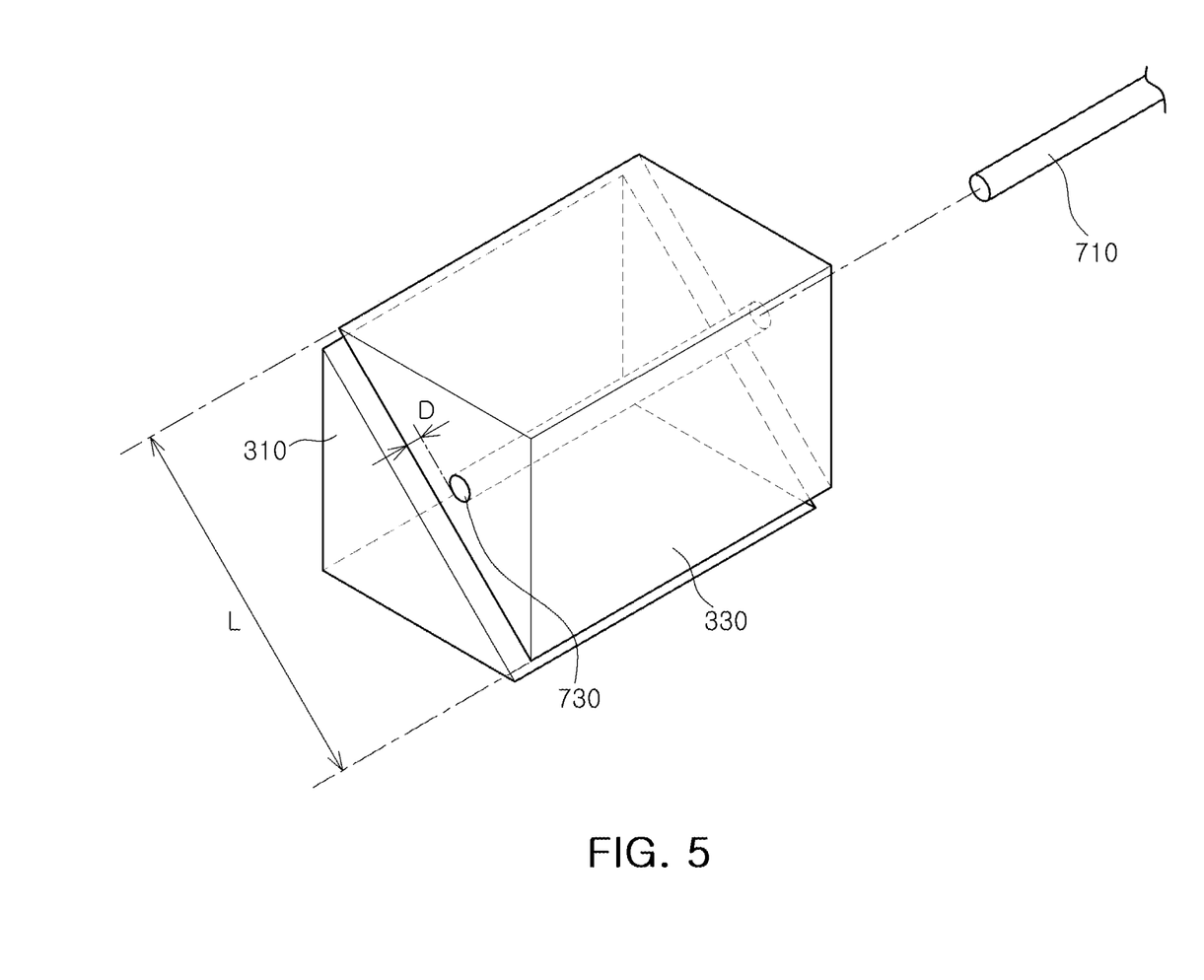
FIG. 5 is a perspective diagram illustrating a second reflective module and a guide unit of an example camera module, in accordance with one or more embodiments.

FIG. 5 is a perspective diagram illustrating a second reflective module and a guide unit of an example camera module, in accordance with one or more embodiments.

Referring to FIG. 5, the guide unit 700 may include a guide shaft 710 and a coupling portion 730.

The guide shaft 710 may be provided in the housing 500. In an example, the guide shaft 710 may be injection-formed together with the housing 500. Differently from the above example, the guide shaft 710 and the housing 500 may be provided as separate components, and the guide shaft 710 may be coupled to the housing 500. The guide shaft 710 may have a cylindrical shape.

The coupling portion 730 may be provided in the second reflective module 300. In an example, the coupling portion 730 may be provided in the second holder 330 of the second reflective module 300. The coupling portion 730 may have a hole or a groove having a shape corresponding to the guide shaft 710.

When the coupling portion 730 is configured to have a hole shape, the coupling portion 730 may be disposed to penetrate a first side and a second side of the second holder 330.

When the coupling portion 730 is configured to have a groove shape, the coupling portion 730 may be disposed to penetrate a first side of the second holder 330.

The second holder 330 may have a contact surface in contact with the second reflective member 310, and the guide unit 700 may be spaced apart from the contact surface. In an example, the contact surface may extend in a direction parallel to the guide shaft 710, and the second reflective member 310 may be mounted on the contact surface.

In an example, a reflective surface of the second reflective member 310 may be substantially parallel to the contact surface. The reflective surface of the second reflecting member 310 may form an angle of approximately 45 degrees with the second and third optical axes, and accordingly, the contact surface may also form an angle of approximately 45 degrees with the second and third optical axes.

In an example, the guide unit may be disposed adjacent to the contact surface. When a length of the contact surface in the direction perpendicular to a length direction of the guide unit 700 is L, and a distance between the guide unit 700 and the contact surface is D, L and D may satisfy 0<D<L/4.

The second reflective module 300 may be mounted on the housing 500 by the coupling between the coupling portion 730 and the guide shaft 710.

Since the second reflective module 300 may rotate around the guide shaft 710 while being mounted on the housing 500, a position of the second reflective module 300 may be adjusted for a focus to be formed in a desired position, and the second reflective module 300 may be fixed to the housing 500 through, as an example, an adhesive member.

In an example, the adhesive member may be applied to a region between the second reflective module 300 and the housing 500 (or the guide shaft 710) in a liquid state and may be cured. As another example, the adhesive member may be attached to a region between the second reflective module 300 and the housing 500 (or the guide shaft 710).

Even when the second reflective module 300 is assembled to the housing 500 through the guide unit 700, it may be necessary to consider rotation tolerance with reference to the guide shaft 710 as a rotation shaft.

However, since sensitivity depending on rotation tolerance is significantly smaller than sensitivity depending on shift tolerance in the second optical axis C2 and the third optical axis C3 directions, and the second reflective module 300 may be fixed by an adhesive member after a position of the second reflective module 300 is adjusted, the camera module in the example may reduce the effect of assembly precision of the second reflective module 300 on image quality.

According to the aforementioned example embodiments, the camera module may reduce sensitivity depending on assembly tolerance of the reflective member.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a folded module, disposed in the housing, and comprising
     a first reflective member;

a lens module, disposed in the housing, and configured to receive light reflected from the folded module;

a holder, disposed in the housing, and comprising a second reflective member configured to receive light that has passed through the lens module; and an image sensor, configured to receive light reflected from the second reflective member, wherein a guide shaft, which is disposed fixedly in the housing, is configured to be inserted into the holder, and wherein the holder is configured to be rotatably inserted onto the guide shaft, and is fixed to the guide shaft and the housing by an adhesive member disposed between the guide shaft and the holder.

2. The camera module of claim 1, wherein the second reflective member is configured to reflect light incident from the lens module in a first direction towards the image sensor in a second direction, and wherein the guide shaft is configured to extend in a direction perpendicular to the first direction and the second direction.

3. The camera module of claim 1, wherein the guide shaft has a cylindrical shape.

4. The camera module of claim 1, wherein the holder has a coupling portion having one of a hole shape and a groove shape into which the guide shaft is inserted.

5. The camera module of claim 1, wherein the holder comprises a contact surface extending in a third direction, parallel to the guide shaft, and the second reflective member is seated on the contact surface.

6. The camera module of claim 5, wherein, when a length of the contact surface in a direction perpendicular to the third direction is L, a distance D between the guide shaft and the contact surface is within a range satisfying the following equation:

$$0<D<L/4.$$ Equation:

7. The camera module of claim 1, wherein the guide shaft is injection-formed together with the housing.

8. The camera module of claim 1, wherein light incident to the first reflective member in a first optical axis direction is changed to travel in a second optical axis direction perpendicular to the first optical axis by the second reflecting member, and is incident to the lens module.

9. The camera module of claim 8, wherein light passing through the lens module is changed to travel in a third optical axis direction perpendicular to the second optical axis direction by the second reflective member, to reach the image sensor.

10. The camera module of claim 9, wherein the third optical axis direction is perpendicular to the first optical axis direction.

11. The camera module of claim 1, wherein the first reflective member or the second reflective member includes one of a mirror and a prism.

12. A camera module, comprising:

a folded module, disposed in a housing, and comprising a first reflective member configured to reflect light incident in a first optical axis direction;

a lens module, disposed in the housing, and configured to receive light reflected from the folded module;

a holder, disposed fixedly in the housing, and comprising a second reflective member configured to reflect light that has passed through the lens module and incident to the holder in a second optical axis direction; and an image sensor, configured to receive light passing through the second reflective member, wherein a guide shaft, provided fixedly in the housing, is configured to be inserted into the holder rotatably, and the holder is fixed to the guide shaft and the housing by an adhesive member disposed between the guide shaft and the holder, and wherein the guide shaft extends in a direction parallel to the first optical axis and perpendicular to the second optical axis.

13. An electronic device, comprising a camera module, comprising:

a housing;

a first reflective module, configured to receive light incident in a first optical axis direction, and output light in a second optical axis direction perpendicular to the first optical axis direction;

a lens module, disposed in the housing, and configured to receive light from the first reflective module;

a second reflective module, configured to receive light from the lens module, and output light in a third optical direction perpendicular to the first optical axis direction and the second optical axis direction;

an image sensor, configured to receive light from the second reflective module; and a guide shaft, disposed fixedly in the housing, and configured to fix the second reflective module to the housing, wherein the second reflective module includes a holder, and the guide shaft is configured to be inserted into the holder, and wherein the holder is configured to be rotatably inserted onto the guide shaft, and is fixed to the guide shaft and the housing by an adhesive member disposed between the guide shaft and the holder.

14. The electronic device of claim 13, wherein the holder comprises a contact surface extending in a third direction, parallel to the guide shaft, and a reflective member of the reflective module is seated on the contact surface.

15. The electronic device of claim 14, wherein, when a length of the contact surface in a direction perpendicular to the third direction is L, a distance D between the guide shaft and the contact surface is within a range satisfying the following equation:

$$0<D<L/4.$$ Equation:

16. The electronic device of claim 13, wherein the first reflective module is configured to rotate with respect to the first optical axis direction and the second optical axis direction.

* * * * *